May 17, 1927.

C. L. CULVER 1,629,021

PLANETARY GEAR DRIVE FOR AUTOMOBILES

Filed April 1, 1925 4 Sheets-Sheet 1

INVENTOR
Charles L. Culver
BY
H.L. & C.L. Reynolds
ATTORNEYS

May 17, 1927.  1,629,021
C. L. CULVER
PLANETARY GEAR DRIVE FOR AUTOMOBILES
Filed April 1, 1925   4 Sheets-Sheet 2

INVENTOR
Charles L. Culver
BY
ATTORNEYS

May 17, 1927. 1,629,021
C. L. CULVER
PLANETARY GEAR DRIVE FOR AUTOMOBILES
Filed April 1, 1925 4 Sheets-Sheet 3
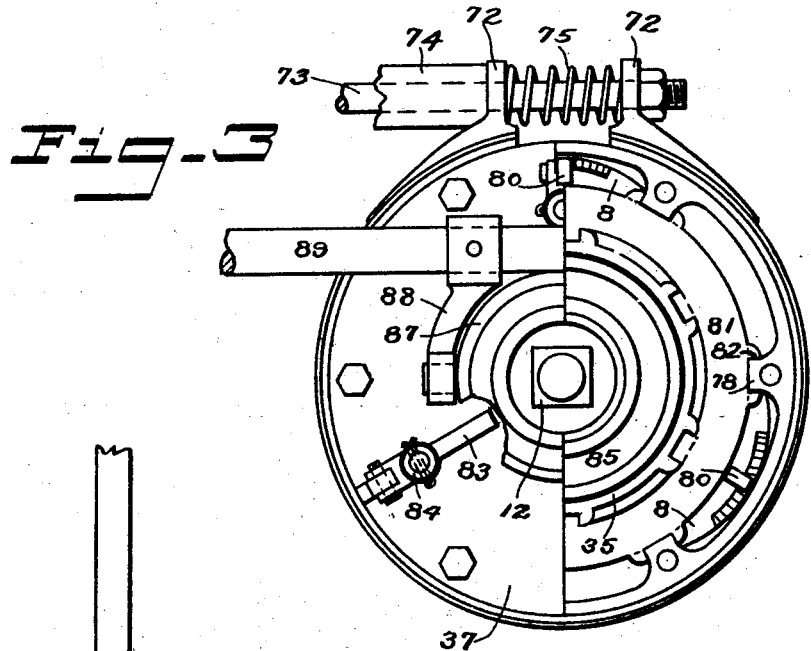
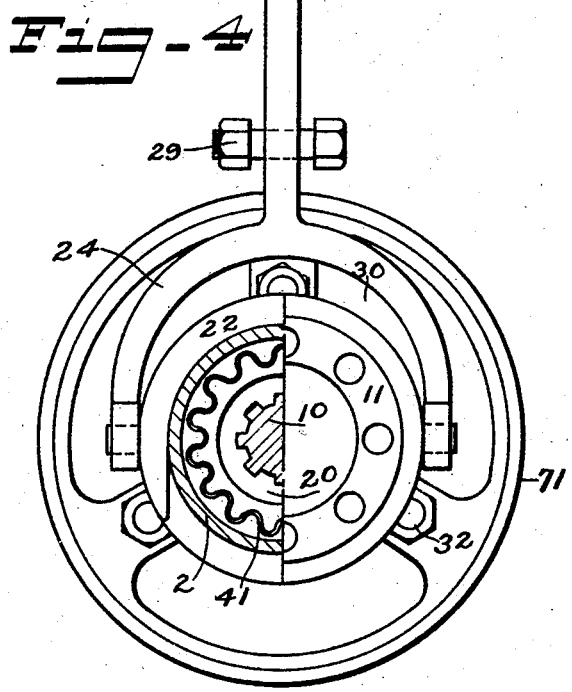
INVENTOR
Charles L. Culver
BY
ATTORNEYS May 17, 1927.
C. L. CULVER
1,629,021
PLANETARY GEAR DRIVE FOR AUTOMOBILES
Filed April 1, 1925   4 Sheets-Sheet 4
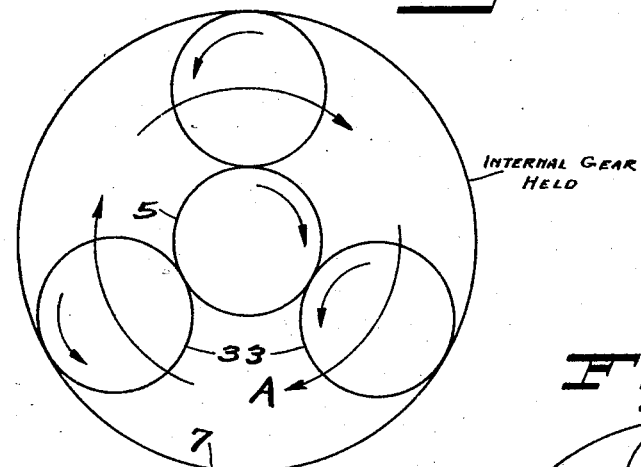
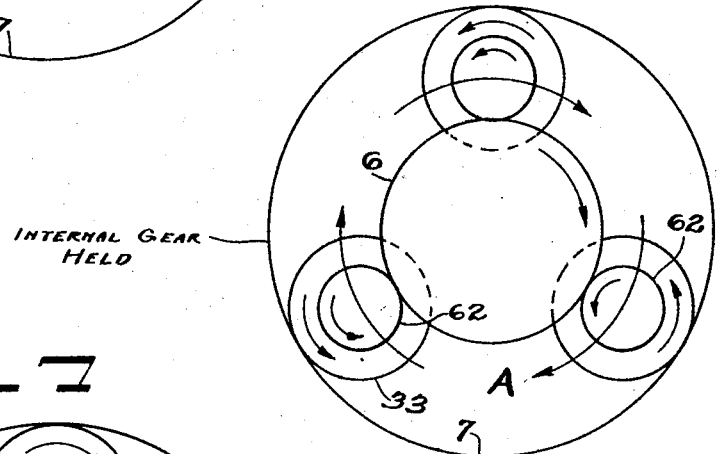
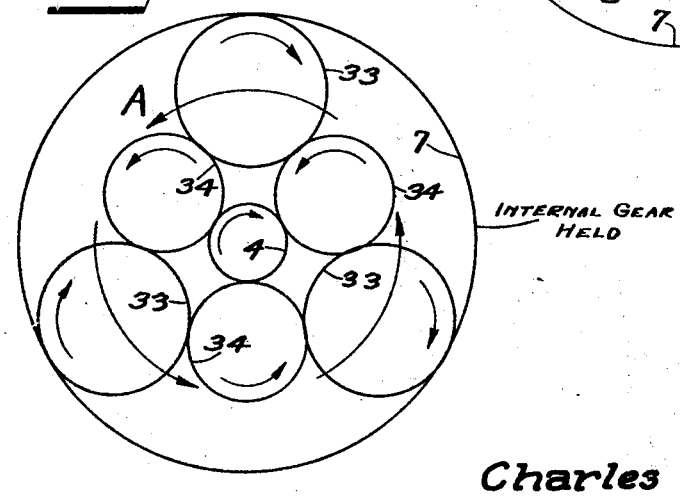
INVENTOR
Charles L. Culver
BY
ATTORNEYS Patented May 17, 1927.

1,629,021

UNITED STATES PATENT OFFICE.

CHARLES L. CULVER, OF OLALLA, WASHINGTON.

PLANETARY-GEAR DRIVE FOR AUTOMOBILES.

Application filed April 1, 1925. Serial No. 19,788.

My invention relates to change gears or variable speed driving mechanisms of that type which employs planetary gearing to secure the changes in speed of driving and also to secure reversibility.

One object of my invention is to secure a wider range of speeds than is secured by that particular embodiment of the planetary gear driving mechanism which is most widely known, namely that employed in the Ford car, and to incorporate the mechanism by which this result is secured within the space occupied by the particular embodiment referred to.

The particular combination of parts employed to secure the desired results, and that which I conceive to be the novel features of my invention may be seen from a study of the accompanying drawings and the following description thereof.

Figure 3 is an end elevation of the device as seen from the left hand side of Figure 1, the right hand half of the figure being a section taken upon the plane indicated by the broken line 5—5 of Figure 1.

Figure 4 is an elevation taken from the right hand end of Figure 1, the left hand half being a section taken on the plane indicated by the broken line 4—4 of Figure 1.

Figures 5, 6 and 7 are diagrams illustrative of the interaction between the parts occurring under different adjustment of the controlling members.

Figure 1:
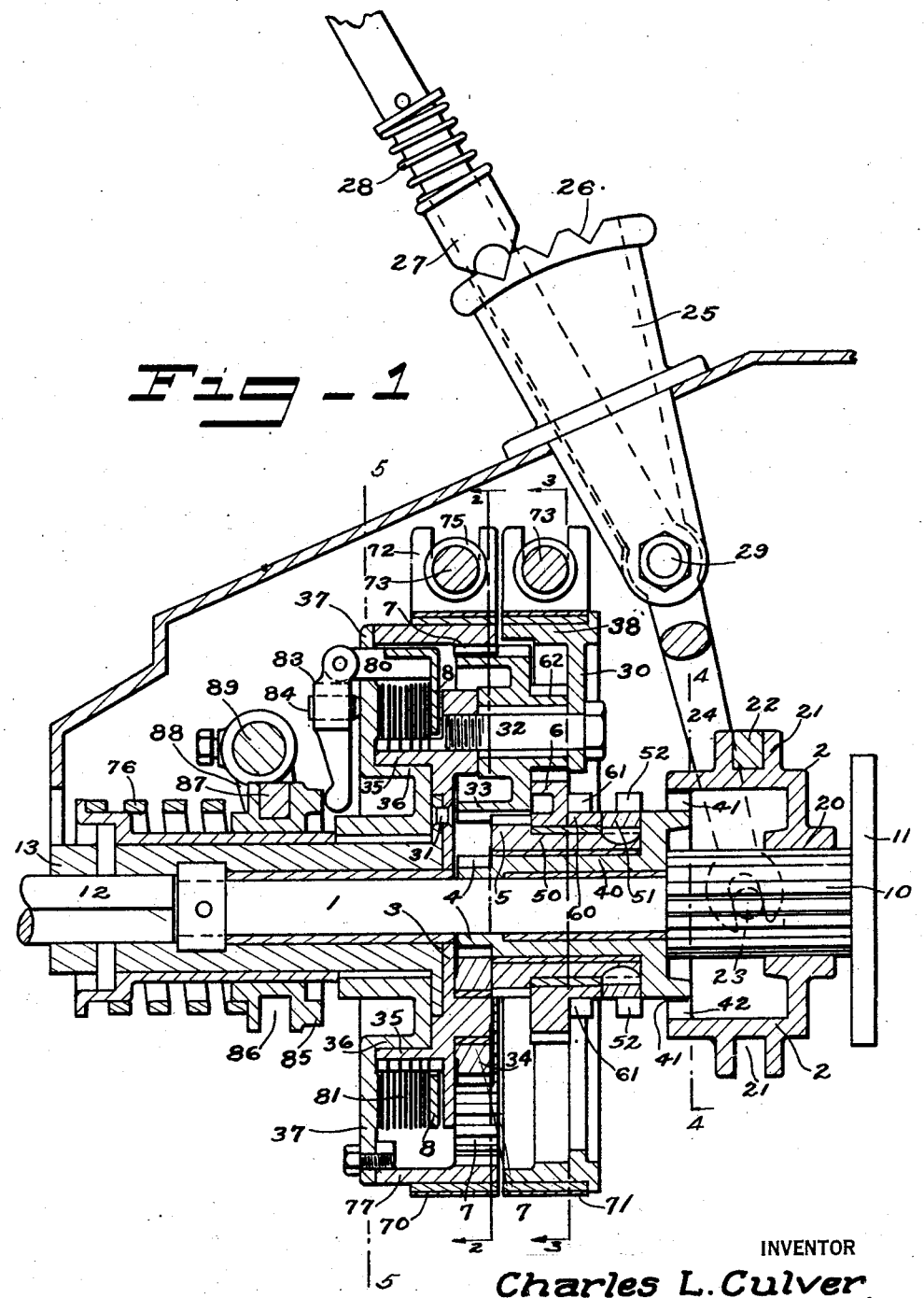
Figure 1 is a longitudinal section of the mechanism employed, taken upon a longitudinal or axial plane.

In the device as illustrated in the drawings, 1 represents the driving shaft and 12 the aligned driven shaft, the latter preferably having at least an end section of square cross section and fitting within a like shaped socket or bore in an enclosing sleeve 13, so that driving torque may be transmitted between them while permitting a limited longitudinal slip.

Mounted to turn freely upon the driving shaft are three sun gears, 4, 5 and 6, each secured to or a part of its respective sleeve 40, 50 and 60, respectively. These are all free to rotate with respect to the shaft 1 except at such times as they may be held to turn with the shaft by the action of the shift controlling clutch mechanism.

Sleeve 50 has a ring 51 secured to its outer end and carrying clutch teeth 52. Corresponding clutch teeth 41 and 61 are carried by sleeves 40 and 60, respectively. A sleeve or casing 2 is mounted to slide freely lengthwise of a section 10 of shaft 1, both sleeve bearing 20 and shaft section 10 being toothed, splined or otherwise held against relative rotation. At the other end of the sleeve or casing 2 is an inwardly projecting set of clutch teeth 42 which are adapted to be engaged with any of the clutch teeth 41, 52 and 61 carried by the sleeves 40, 50 and 60. The sets of teeth 41, 52 and 61, are separated lengthwise the shaft enough to fully accommodate the clutch teeth 42 between adjacent sets.

The movement of the clutch sleeve 2 is by means of a shift lever 24 which is pivoted at 29 and has a yoke end engaging a pin or pins 23 carried by a runner 22 seated in a peripheral groove 21 on the case 2. A sector 25 having holding teeth 26 engaged by a pawl 27 held down by a spring 28, retains the sleeve 2 in whatever position it may be placed.

Sleeve 13, which is secured to the driven shaft 12, has a planet carrier disk 3 secured thereto, as by rivets 31. Bolts or pins 32 fixed to disk 3 form journals for planet gears 33 and 62 which are fixed to or formed unitary with each other. I have shown the planet gears as arranged in sets of three, although as is known of planetary gears, the number in a set is not a material consideration.

The planet gears 33 and 62, besides being driven by direct engagement with their respective sun gears 5 and 6, may also be driven from the sun gear 4 through intermediate gears 34 which mesh with planet gears 33. The use of this intermediate gear secures reversal in direction of turning of the driven shaft.

Figure 2:
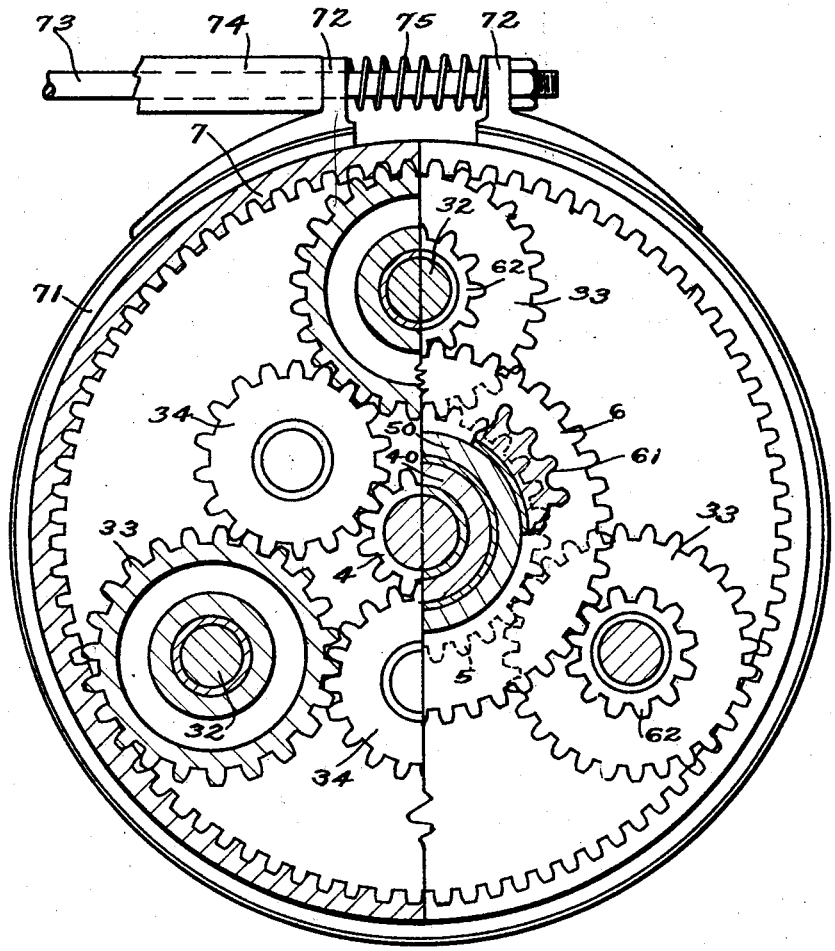
Figure 2 is a transverse section of the mechanism, the left hand half of this figure being upon the plane 2—2 of Figure 1 and the right hand half being upon the plane 3—3 of Figure 1.

A single orbit gear 7 is used. This is provided with the usual holding brake, consisting of a band 70. The planet carrier 30 is provided with a flange 38 upon which is mounted another brake band 71. These brakes may be of any suitable construction and be operated by any suitable means. A standard means is shown in Figure 2, in which the band is provided with end lugs 72 through which passes the operating rod 73, a fixed guide 74 being used and separating spring 75.

The brake band 71 which is mounted upon a flange 38 carried by the side 30 of the planet carrier, serves as a service brake as the planet carriers are at all times secured to turn with the driven shaft 12, through the sleeve 13.

A multiple disk clutch 81 is employed, one set of plates being fixed to the flange 35 carried by the disk 3 of the planet carrier, and the other set of lugs 82 carried by the orbit gear 7. A ring 8 at the inner side of the disks 81 is connected by pins or arms 80 to the setting levers 83 which fulcrum upon adjustable fulcrum pins upon an outer cover plate 37. The inner ends of the setting levers 83 are engaged by a setting collar 85 which has a groove 86 containing a follower 87 operated by an arm or arms 88 carried by a rock shaft 89. A spring 76 normally holds the clutch disks in engagement.

There is a measure of relationship for synchronous and reverse action between the means employed for applying and releasing the friction clutch and the brake upon the orbit wheel. When one is applied the other is released. As there is thought to be nothing of particular novelty or essential character in this, it has not been illustrated.

When the clutch 2 is shifted between the clutch teeth 41, 52 and 61, the friction clutch 81 should momentarily be released. As this has to do with the method of handling the mechanism, illustration thereof is both difficult and unnecessary.

In Figures 5, 6 and 7 are shown diagrams showing the manner of movement of various gears under conditions wherein the orbit gear is held and engagement of the clutch 2 is respectively with the teeth 41, 52 and 61 of the different sun gears. The arrow A, shows the direction of turning of the planet carrier and therefore of the driven shaft. This gives one speed in reverse and two ahead.

If, however, the orbit gear is released from its controlling brake so that it may freely turn, the application of the friction clutch 81 secures the orbit gear to the orbit carrier, from which it follows that by the engagement of the clutch 2 with any one of the sun gear sleeves, the planet carrier and the driven shaft may be directly driven ahead, and therefore by use of the device may be obtained three speeds ahead and one in reverse.

The device may be designed for a Ford car so as to fit within the same space as that occupied by the regular Ford transmission. In fact the outline of the enclosing casing shown in Figure 1 is drawn to the exact dimensions of the Ford transmission casing.

What I claim as my invention is:

1. A planetary transmission comprising a complete planetary gear train comprising a sun gear, planet carrier and planet gears, and a supplemental gear train comprising a sun gear and intermediate planetary gears journaled upon the planet carrier of the first train and meshing with the planet gears of said first train, and means for transmitting power through either sun gear.

2. A change speed transmission for automobiles comprising three sun gears of differing diameters, means for selectively engaging said sun gears with the driving member, a single planet carrier, planet gears journaled on said carrier and each consisting of two connected gears of different diameters meshing each with its respective one of the sun gears, an orbit gear meshing with the larger of the planet gears, supplemental planet gears carried upon the planet carrier and connecting the third sun gear with one of the other planet gears, a friction clutch connecting the orbit-gear and the driven shaft and means for controlling the application of said friction clutch.

Signed at Seattle, King County, Washington, this 26th day of March, 1925.

CHARLES L. CULVER.